June 2, 1936.  A. P. BALL  2,043,089

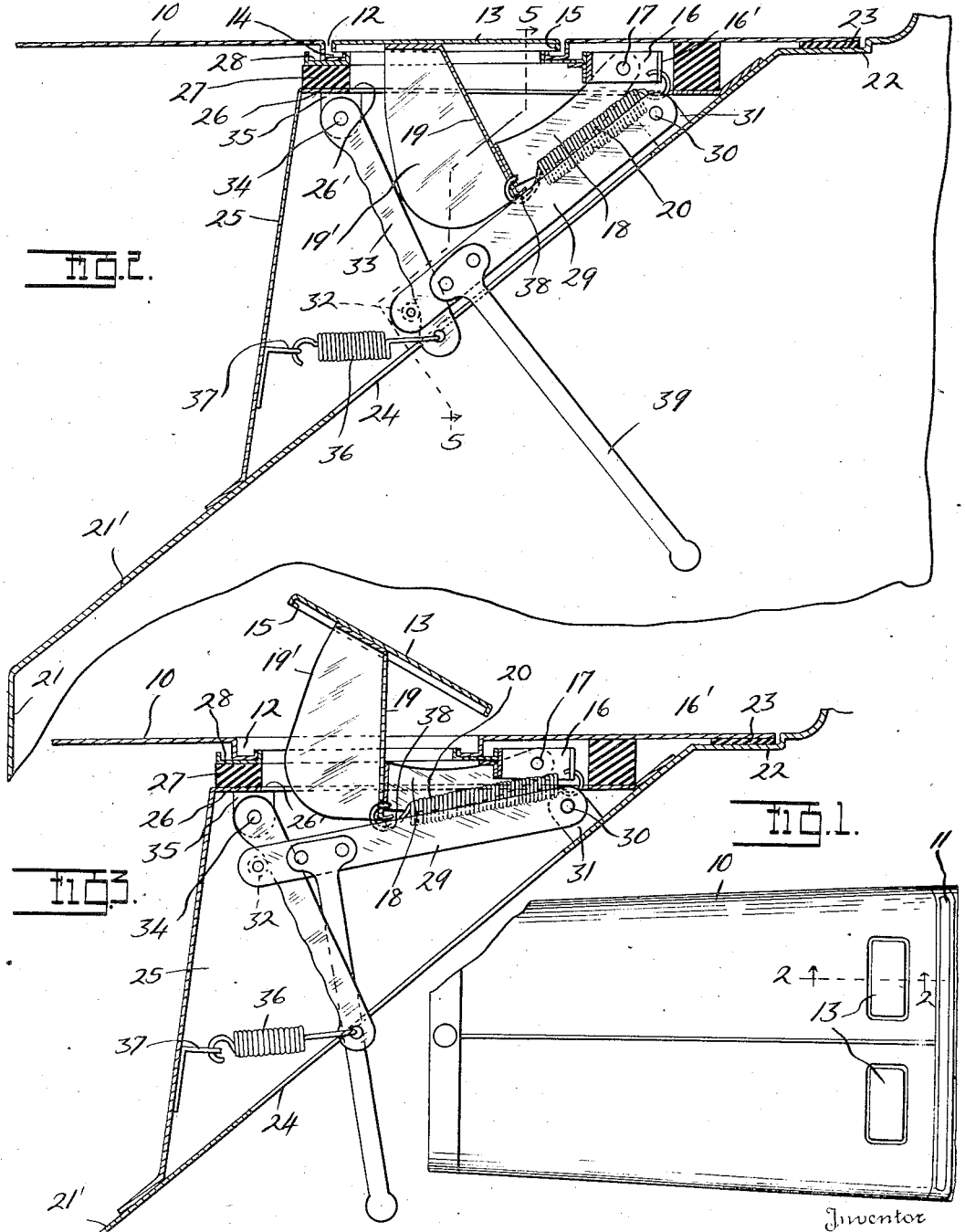

VENTILATOR CONSTRUCTION

Filed May 9, 1932  2 Sheets-Sheet 2

Inventor
Albert P. Ball

Patented June 2, 1936

2,043,089

UNITED STATES PATENT OFFICE 2,043,089

VENTILATOR CONSTRUCTION

Albert P. Ball, Detroit, Mich., assignor to Briggs Manufacturing Company, Detroit, Mich., a corporation of Michigan Application May 9, 1932, Serial No. 610,242

7 Claims. (Cl. 98—2)

This invention relates to ventilators for motor vehicles and more particularly to an improved construction and arrangement of ventilator and the operating mechanism therefor, especially adapted for use in vehicle bodies wherein the ventilator opening is arranged in the movable hood section.

The invention finds particular utility in vehicle bodies wherein the usual cowl is dispensed with and wherein the hood sections extend rearwardly to or approximately to the windshield, thus necessitating the positioning of the usual so-called cowl ventilators in the movable hood sections.

The several objects, advantages and novel details of construction of my invention will be made more apparent as this description proceeds, especially when considered in connection with the accompanying drawings wherein Figure 1 is an elevational view of the hood portion of a vehicle showing the location of the ventilators;

Figure 2 is an enlarged fragmentary vertical longitudinal section taken substantially on the plane indicated by line 2—2 in Figure 1;

Figure 3 is a view similar to Figure 2 showing the ventilator closure in open position.

Figure 4:
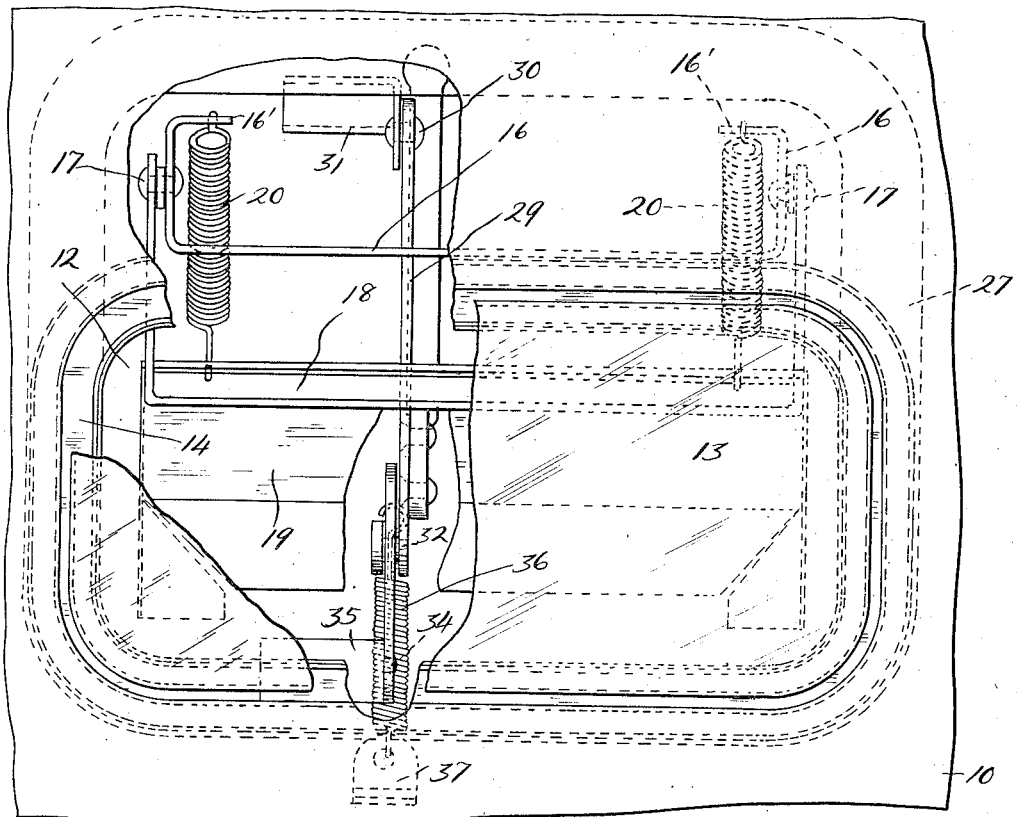
Figure 4 is a top plan view partly broken away of the structure illustrated in Figure 2.
Figure 5:
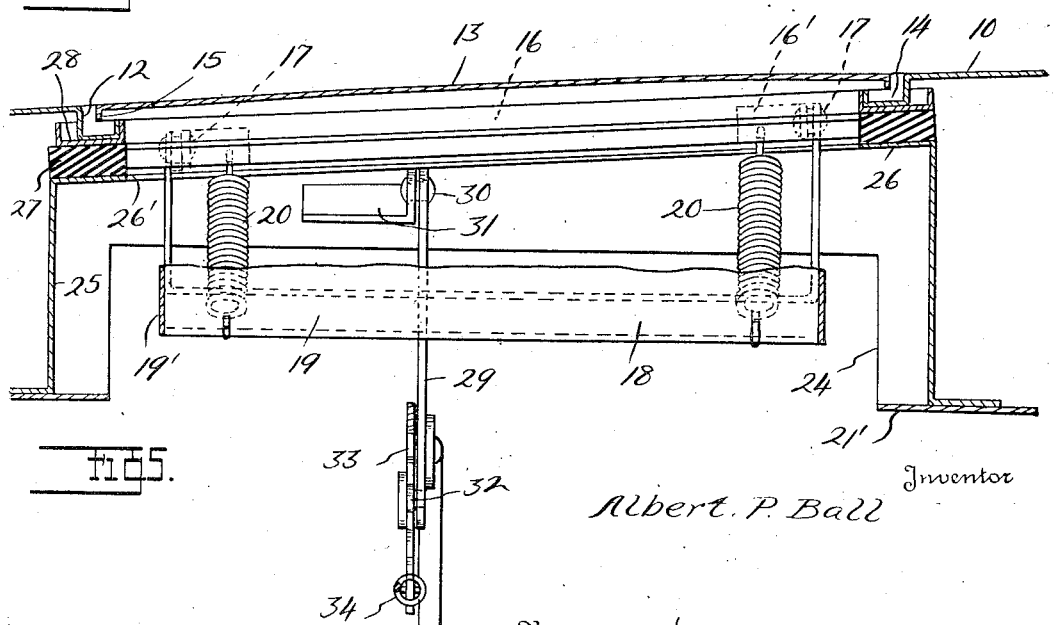
Figure 5 is a vertical sectional view taken substantially on the plane indicated by line 5—5 in Figure 2.

As shown in Figure 1 the hood sections 10 of the motor vehicle body extend substantially to the windshield 11, thus eliminating the usual cowl, and in structures of this character, or in other cases where it is desirable to place the ventilator openings in the movable hood sections, some means must be provided for operating the closures for the ventilator openings and at the same time permit the raising and lowering of the hood sections.

As shown probably most clearly in Figures 2 and 3, either or both of the hood sections 10 are provided with a ventilator opening 12, a closure or cover 13 being provided therefor.

The material of the hood section 10 at the periphery of the opening 11, is preferably shaped to provide a channel 14 substantially as illustrated which channel may cooperate with the downturned edge 15 of the cover in the closed position of the latter as illustrated.

The cover or closure 13 is pivotally or hingedly mounted on and carried by the hood section 10 and for this purpose a bracket 16 is secured to the hood section 10 and to this bracket there is pivotally mounted as at 17, a U-shaped bracket 18.

Depending from the cover or closure 13 is a wall member or baffle 19, preferably, although not necessarily, also provided with laterally extending side edges or wings 19'. These wall portions 19 and 19' act as a deflector for the air when the closure 13 is open to direct the same into the ventilator opening. The base of the U-shaped bracket 18 is rigidly secured to the wall member 19 so that by this association of parts the closure or cover 13 is pivotally mounted on the bracket 16 as at 17.

For normally retaining the closure 13 in its closed position I provide one or more springs 20, one end of the spring being secured to an end 16' of the bracket 16 while the other end is secured to the lower edge of the wall member 19.

Referring to Figure 2, the reference character 21 indicates a fragment of the dash of the vehicle body and 21' indicates an inclined extension of the dash 21. This inclined portion 21' of the dash is jointed to the belt bar 22 of the vehicle body and provides a rest or support for the rear edge of the movable hood sections 10, this support being shown as provided with a lacing or the like 23 to cushion the contacting portions of the hood sections.

The dash portion 21' is provided with an opening 24 therethrough so that air coming in through the ventilator opening may flow into the interior of the vehicle. Mounted upon the inclined portion 21' of the dash and substantially surrounding the opening 24 formed therein, is a housing 25 constituting a ventilator conduit. This conduit is built up to provide a substantially horizontal upper wall 26 which is disposed immediately adjacent the ventilator opening 12 in the hood section 10 when the latter is in lowered or closed position. This wall 26 is provided with an opening 26'.

Secured to the horizontal top wall 26 of the ventilator conduit is a cushion or pad member 27 and superimposed on this pad member is a channel 28 into which the channel portion 14 of the hood engages. The channel 28 follows the contour of the opening 12 whereas the pad 27 extends beyond the bracket 16 as will be seen by comparison of Figures 2 and 4.

For raising the closure member 13 when the movable hood section is in lowered position, I provide a lifter lever or member 29 pivotally mounted as at 30 to a bracket 31 carried by the dash portion 21'. The free end of this lifter lever 29 is provided with a roller or the like 32 which engages the scalloped or recessed edge of a latch lever or member 33, this latter being pivotally mounted as at 34 on a bracket 35 carried by the top wall 26 of the ventilator conduit. Attached to the lower free end of this latch member is a spring 36, the other end of which is connected as at 37 to the front wall of the ventilator conduit. This spring 36 acts to hold the latch member and the roller 32 in any position to which the latter may be adjusted.

The lifter lever or member 29 engages the lower edge 38 of the wall member 19 and when the lifter member 29 is raised it will, as a consequence thereof, raise the cover or closure 13 as will be apparent by comparison of Figures 2 and 3. For this purpose an operating handle 39 is secured to the lifter member 29.

From the foregoing it will be apparent that when the movable hood section 10 is lowered, the wall member 19 comes into engagement with the lifter member 29 so as to render the control mechanism for the closure operative. The springs 20 act to normally maintain the closure 13 in closed position but obviously this closure may be raised against the action of these springs by properly manipulating the handle 39 and so long as the hood section 10 is in closed position the cover 13 will be maintained in its adjusted position by reason of the engagement of the roller 32 with the latch bar 33. As the lifter member 29 is moved from the position illustrated in Figure 3 to that illustrated in Figure 2, the spring or springs 20 will act to move the cover to closed position.

In a like manner, if the movable hood section 10 is raised while the closure is in the open position illustrated in Figure 3, the springs 20 will act to close the cover 13, but when the hood section has again been lowered the parts will engage as shown in Figure 3 to again open the cover 13.

Obvious modifications will suggest themselves to those skilled in this art and to this end reservation is made to make such changes as may come within the purview of the accompanying claims.

What I claim as my invention is:

1. In a vehicle body, a movable hood section having a ventilator opening therein, a closure for said opening hingedly mounted on said hood section, a dash, a ventilator conduit secured to said dash and extending under said hood section into registration with said opening when said hood is closed, and adjustable closure operating means carried by said dash and engageable with said closure when said hood section is closed, said closure being movable with the hood section independently of said means into and out of operative relation to said means in various adjusted positions of the latter.

2. A vehicle body having a pivoted engine hood provided with a ventilating opening in its top, a cover carried by the hood and lying within said opening substantially flush with the hood when the cover is closed, means engageable with the cover for opening the same, said cover being movable with the hood independently of said means when the hood is raised and lowered, and said means being supported independently of the hood and cover.

3. A vehicle body having a pivoted hood section provided with a ventilating opening communicating with the passenger compartment of said body, a movable cover carried by the hood section for closing said opening, and an adjustable device supported independently of said hood section for opening the cover, said device being incapable of operating the cover when the hood section is raised but effective in any of its adjusted positions to actuate the cover when the hood section is lowered.

4. A vehicle body having a pivoted hood section provided with a ventilating opening communicating with the interior of said body, a movable cover for closing said opening carried by and movable with the hood section, said cover having a depending baffle, and an adjustable device supported below and independently of said hood section in contact with said cover baffle when the hood is lowered and shiftable into predetermined adjusted position for opening the cover, said device and cover baffle being out of contact when the hood is raised.

5. A vehicle body having a pivoted hood section provided with a ventilating opening communicating with the passenger compartment of said body, a pivoted cover carried by the hood section and movable therewith for closing said opening, an adjustable device supported independently of said hood and cover engaging a depending portion of said cover when the hood is lowered and shiftable into various adjusted positions for opening the cover, and means engaging said device for releasably holding it in said adjusted positions, said depending cover portion operatively engaging said device when the hood section is lowered and being out of operative relation with the device when the hood is raised.

6. A vehicle body having a pivoted hood section provided with a ventilating opening adapted to communicate with the passenger compartment of said body, a hinged cover carried by and movable with the hood section for closing said opening, a baffle carried by said cover an adjustable device pivotally supported independently of said hood section in contact with said baffle when the hood is lowered and shiftable into predetermined adjusted position for opening the cover a predeterminated amount, and a spring connected to the hood section and engaging said cover baffle for normally maintaining the cover in closed position irrespective of the position of said hood section.

7. A vehicle body having a pivoted hood section provided with a ventilating opening in communication with the passenger compartment of said body, a pivoted cover carried by the hood section and movable therewith for closing said opening, said cover having a deflector, an adjustable device supported independently of said hood and cover engaging said deflector when the hood is lowered and shiftable into various adjusted positions for opening the cover, means engaging said device for releasably holding it in said adjusted positions, said deflector operatively engaging said device when the hood section is lowered and being out of operative relation with the device when the hood is raised, and a spring for closing the cover in any position thereof when the hood is raised or lowered.

ALBERT P. BALL.